United States Patent [19]

Weyer et al.

[11] 4,071,612

[45] Jan. 31, 1978

[54] PROCESS FOR THE INCINERATION OF CONTAMINATED SALT-BEARING SOLUTIONS

[75] Inventors: Horst Weyer, Schwerte; Ludwig Mühlhaus, Hennen; Gerhard Oberschachtsiek, Holzwickede, all of Germany

[73] Assignee: Friedrich Uhde GmbH, Dortmund, Germany

[21] Appl. No.: 718,170

[22] Filed: Aug. 27, 1976

Related U.S. Application Data

[63] Continuation of Ser. No. 514,437, Oct. 15, 1974, abandoned.

[51] Int. Cl.² .................... C01B 31/20; C01B 5/00
[52] U.S. Cl. .................................. 423/659; 423/1; 423/437; 423/580; 423/DIG. 16
[58] Field of Search ............... 423/659 F, 1, 437, 580

[56] References Cited

U.S. PATENT DOCUMENTS

| | | |
|---|---|---|
| 2,631,921 | 3/1953 | Odell ............................. 423/659 F |
| 3,139,726 | 7/1964 | Wilson et al. .............. 423/659 F UX |
| 3,309,262 | 3/1967 | Copeland et al. ............ 423/277 R X |

*Primary Examiner*—Edward Stern
*Attorney, Agent, or Firm*—Malcolm W. Fraser

[57] ABSTRACT

Process and apparatus for incinerating contaminated salt-bearing solutions in a fluidized bed to which streams of solution, of fuel required for incineration and of combustion air are injected and the quantities of these streams and the quantity of the fluidized bed material are adjusted to safeguard incomplete combustion in the fluidized bed, to maintain the temperature of the bed below the fusion temperature of the salt and to achieve a post-combustion temperature of 800° C and more of the gas emanating from the fluidized bed and reaching the free space above the bed, i.e. the afterburner.

3 Claims, 1 Drawing Figure

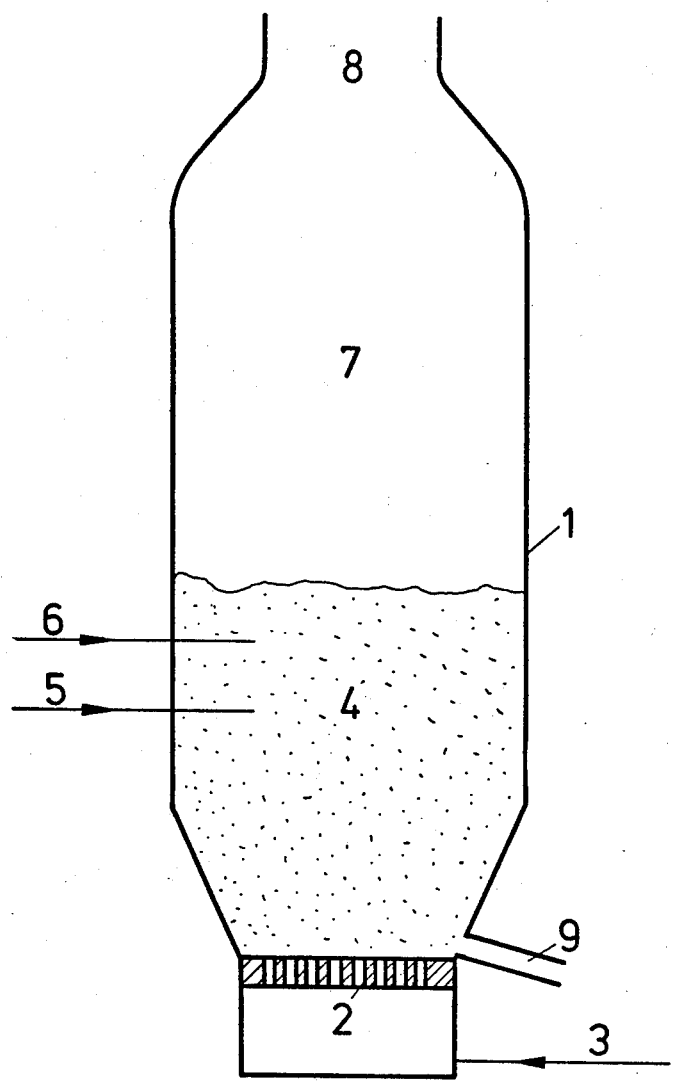

PROCESS FOR THE INCINERATION OF CONTAMINATED SALT-BEARING SOLUTIONS

This is a continuation of application Ser. No. 514,437 filed Oct. 15, 1974, now abandoned.

BACKGROUND OF THE INVENTION

The present invention relates to a process for the incineration of contaminated salt-bearing solutions that are preferably obtained in the chemical industries, said incineration taking place in a fluidized-bed reactor. Contaminated salt-bearing solutions from chemical processes are generally a waste effluent and require treatment for the elimination of contaminants. Elimination of contaminants shall be construed to mean that the components contained in the solution are converted to reutilizable substances and/or to nuisance-free emissions.

For satisfying these requirements, it is known to burn cantaminated salt-bearing solutions in a reactor either by adding auxiliary fuel or, if the solutions contain a sufficient quantity of combustible matter, by autogeneous combustion. As described in German Pat. DAS No. 1,517,166, for example, waste liquor from a pulp manufacturing facility is sprayed from top to bottom into a fluidized-bed reactor and burnt at a temperature ranging from 528° to 760° C. The temperature in the free space, that means above the fluidized bed, shall be held at less than 538° C, preferably at a level of 177° C. Consequently, this space serves as what may be called the preheating zone for the waste liquor. The disadvantage inherent in this method is that the exhaust gas contains unburnt organic matter that has not been heated to temperatures exceeding the range from 177° to 316° C. The countercurrent flow of injected waste liquor and hot combustion gas from the fluidized bed does not ensure sufficient contact of the total quantity of injected waste luquor with the hot gas in the fluidized bed.

SUMMARY OF THE INVENTION

The object of this invention is to provide a process and apparatus for incinerating contaminated salt-bearing solutjions in a fluidized bed, incineration being controlled to avoid a breakdown of the fluidized bed as may be caused by salt agglomeration and to ensure that the exhaust gas passes across a temperature zone of 800° C and more while avoiding any subsequent contact between exhaust gas and injected solution, the mechanical design providing for an uncomplicated feeding of the fluid streams to be processed.

According to this invention, the problem is solved in that the streams of solution, of fuel required for incineration, and of combustion air are injected into the fluidized bed and that the quantities of these streams and the quantity of fluidized-bed material are adjusted to safeguard incomplete combustion in the fluidized bed, to maintain the temperature level of the fluidized bed below the fusion temperature of the salt and to achieve a postcombustion temperature of 800° C and more of the gas emanating from the fluidized bed and reaching the free space above the fluidized bed, i.e. the afterburner.

In order to obtain a uniform configuration of the fluidized bed grains whose growth is attributable to the crystallization of salt upon the solid particles of the fluidized bed, it is another feature of the invention to hold the fluidized-bed temperature by more than 100° C below the fusion temperature of the salt or salt mixture.

The process according to the present invention permits using a fluidized bed that consists essentially of the solid residues from the salt-bearing solution accumulating increasingly in the original fluidized bed.

According to a preferred practice relating to this invention, a predetermined thickness of the fluidized bed is held by a continuous withdrawal of fluidized-bed material to maintain the optimum proportion of fluidized-bed space and free postcombustion space. The unique feature and advantage of the process according to this invention comprises creating two distinct zones of widely different temperatures in the fluidized-bed reactor. Owing to controlled feed rates of fuel, combustion air, and solution to be incinerated, the temperature prevailing in the fluidized bed ranges from just above the lower flammable limit of the fuel to at least 100° C below the fusion temperature of the salt or salt mixture.

The fusion point of the salt is beyond this temperature range; consequently, there is no risk of lump formation and breakdown of the fluidized bed. As the entire stream of combustion air is allowed to pass across the fluidized bed grate, a high absorption capacity for water vapor and, consequently, a low content of free water, is achieved even at relatively low temperatures, and extinction of the flame cores through the presence of free water is avoided. This feature causes a substantial portion of the salt contained in the solution to deposit by crystallization on the fluidized-bed material so that it may continuously be withdrawn.

Despite stoichiometric and superstoichiometric proportions of the fluids present, conditions prevailing in the fluidized bed are controlled to achieve incomplete combustion of the fuel and of the combustible components of the solution. Complete combustion of the combustible components takes place in the afterburner receiving the gas stream from the fluidized bed. The temperature level of 800° C and more ensures that all organic matter contained in the feed solution is completely converted to harmless compounds, such as $CO_2$ and $H_2O$. Because the process fluids, viz. air, fuel, and feed solution are injected into the fluidized bed, the process proves to be particularly stable and easy to regulate. A typical salt-bearing solution contains, for example, 1% organics, 25% salts, and 74% water. However, salt concentration may be substantially higher. The device provided for by this invention even permits treating solutions that contain undissolved salts. Such solutions should, however, be agitated before being admitted to the fluidized-bed reactor.

DRAWING OF PREFERRED FORM

An example of application of this invention is illustrated schematically on the drawing.

DETAIL DESCRIPTION OF PREFERRED FORM

Fluidized-bed reactor 1 has an upright housing which contains a grate 2 adjacent the bottom end that carries a bed 4 composed of small solid particles, said bed being supported by combustion air under pressure admitted through line 3. At the time of initial start-up, the bed usually consists of sand of a certain definite grain size. The fuel required for incineration is admitted to the fluidized bed through line 5. No complete combustion of the fuel takes place in the fluidized bed. The salt-bearing solution to be subjected to incineration and added through line 6 need not be dispersed with the aid of special devices, such as spray nozzles.

Distribution of the liquid to be incinerated is safeguarded by the air-agitated fluidized bed. Part of the salt, generally more than 50%, contained in the solution will deposit on the air-borne solid particles of the fluidized bed or will crystallize to form new solid particles. The balance will be entrained by the gas mixture from the fluidized bed to the upper space, viz. afterburner 7, of the fluidized-bed reactor, said gas mixture being composed of residual air, residual fuel, and residues of gaseous combustible organic substances.

The oxidation reaction being undisturbed in the afterburner, complete combustion of residual combustible components and their conversion to nuisance-free gas is achieved at temperatures ranging from 800° to 1,000° C. The combustion products mixed with residual salt leave the fluidized-bed reactor through outlet 8 at the top of the reactor housing. A side outlet 9, adjacent to and above the grate 2, is provided on the fluidized-bed reactor to permit continuous withdrawal of solid salt for preventing any growth of the fluidized bed beyond its design or predetermined level.

A semi-industrial pilot plant equipped with a fluidized-bed reactor of 0.5 m grate area, approximately 1.5 m level of the fluidized bed, and about 6 m height of the afterburner, was operated at 400° C for the fluidized bed and 800° to 1,000° C for the afterburner, the feed rate of salt-bearing solution being 130 to 250 l/hr. No residual unburnt matter could be detected in the exhaust gas even when the fluidized-bed temperature dropped to 200° C while the afterburner temperature was at 800° to 1,000° C. Both light fuel oil and propane were used for firing.

Oxygen-enriched air or pure oxygen can be used to meet oxygen requirements of the process.

The composition of the salt-bearing solution was the same as outlined in this description, and the fusion temperature of the salt mixture was 550° C.

What we claim is:

1. A process for the incineration of fusible salt-bearing waste pulping liquors containing combustible organic substances in a fluidized bed while avoiding break down of the fluidized bed in an incinerator provided with a free space above the fluidized bed sufficient to provide in the incinerator two distinct burning zones of widely different temperatures, consisting essentially only of
   A. injecting into the fluidized bed
      1. said liquor
      2. fuel and
      3. combustion air under pressure upwardly into said bed so as to maintain said bed in a fluidized state
   B. adjusting the quantities of said injections and the fluidized bed material so as to maintain (a) incomplete combustion in the fluidized bed at a temperature at least 100° C below the fusion temperature of the fusible salt or salt mixture in said liquor and which is also widely different from the temperature attained above the fluidized bed, and (b) substantially complete combustion of the combustible material leaving the fluidized bed at a temperature attaining at least 800° C at which combustion of all of the combustible components takes place in a distinct burning zone in the free space above the fluidized bed.

2. The process of claim 1 wherein said liquor is injected in a non-dispersed form.

3. A process for the incineration of fusible salt-bearing aqueous waste effluent in a chemical process containing combustible organic substances in a fluidized bed while avoiding break down of the fluidized bed in an incinerator provided with a free space above the fluidized bed sufficient to provide in the incinerator two distinct burning zones of widely different temperatures, consisting essentially only of
   A. injecting into the fluidized bed
      1. said effluent
      2. fuel and
      3. combustion air under pressure upwardly into said bed so as to maintain said bed in a fluidized state;
   B. adjusting the quantities of said injections and the fluidized bed material so as to maintain (a) incomplete combustion in the fluidized bed at a temperature at least 100° C below the fusion temperature of the fusible salt or salt mixture in said effluent and which is also widely different from the temperature attained above the fluidized bed, and (b) substantially complete combustion of the combustible material leaving the fluidized bed at a temperature attaining at least 800° C at which combustion of all of the combustible materials takes place in a distinct burning zone in the free space above the fluidized bed.

* * * * *